US012636972B2

(12) United States Patent
Wrobel et al.

(10) Patent No.: US 12,636,972 B2
(45) Date of Patent: May 26, 2026

(54) VEHICLE WITH RENTAL MODE AND POWER CONTROLS

(71) Applicant: FORD GLOBAL TECHNOLOGIES, LLC, Dearborn, MI (US)

(72) Inventors: Shannon Wrobel, Ann Arbor, MI (US); Alexiluis Dominguez-Morales, Dearborn, MI (US); Cleyton Cavallaro, Clawson, MI (US); Wendy Lynn MacLennan, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 18/126,618

(22) Filed: Mar. 27, 2023

(65) Prior Publication Data
US 2024/0326644 A1 Oct. 3, 2024

(51) Int. Cl.
| | |
|---|---|
| B60L 58/12 | (2019.01) |
| B60L 1/00 | (2006.01) |
| B60L 50/60 | (2019.01) |
| G06Q 30/0645 | (2023.01) |

(52) U.S. Cl.
CPC .............. B60L 58/12 (2019.02); B60L 1/006 (2013.01); B60L 50/60 (2019.02); G06Q 30/0645 (2013.01); B60L 2240/70 (2013.01)

(58) Field of Classification Search
CPC ......... Y02T 10/62; Y02T 10/64; Y02T 10/70; Y02T 10/72; B60L 1/006; B60L 3/0046; B60L 3/04; B60L 58/12; B60L 58/13; B60L 58/14; B60L 50/50; B60L 50/60; B60L 2240/427; B60L 2240/70; G06Q 30/0645; B60W 10/24; B60W 10/26;

B60W 20/13; B60W 2510/24; B60W 2510/242; B60W 2510/244; B60W 2510/305; B60W 2710/086; B60W 2710/244
See application file for complete search history.

(56) References Cited

U.S. PATENT DOCUMENTS

| | | | |
|---|---|---|---|
| 9,059,447 B2 | 6/2015 | Scheucher | |
| 11,351,886 B2 | 6/2022 | Zhao | |
| 2017/0334423 A1* | 11/2017 | King | B60K 6/20 |
| 2018/0009327 A1* | 1/2018 | Ricci | G07C 5/0816 |
| 2020/0086748 A1* | 3/2020 | Bolger | H02J 7/00 |
| 2021/0328270 A1* | 10/2021 | Min | H02J 7/0013 |
| 2021/0339650 A1* | 11/2021 | Hashimoto | B60L 50/60 |

FOREIGN PATENT DOCUMENTS

DE 102013222421 A1 5/2014

OTHER PUBLICATIONS

Hannan, et al. Vehicle to Grid Connected Technologies and Charging Strategies: Operation, Control, Issues and Recommendations, Journal of Cleaner Production, Jan. 28, 2022, vol. 339, 22 pages.

* cited by examiner

*Primary Examiner* — Brandon Z Willis
(74) *Attorney, Agent, or Firm* — David B. Kelley; Brooks Kushman P.C.

(57) ABSTRACT

A controller, responsive to receiving a message from a device remote from a vehicle defining a power limit during a rental mode of operation for a power outlet, prevents power output by the power outlet from exceeding the power limit during the rental mode of operation and responsive to the power output reaching the power limit during the rental mode of operation, generates a request for the device to increase the power limit.

20 Claims, 3 Drawing Sheets

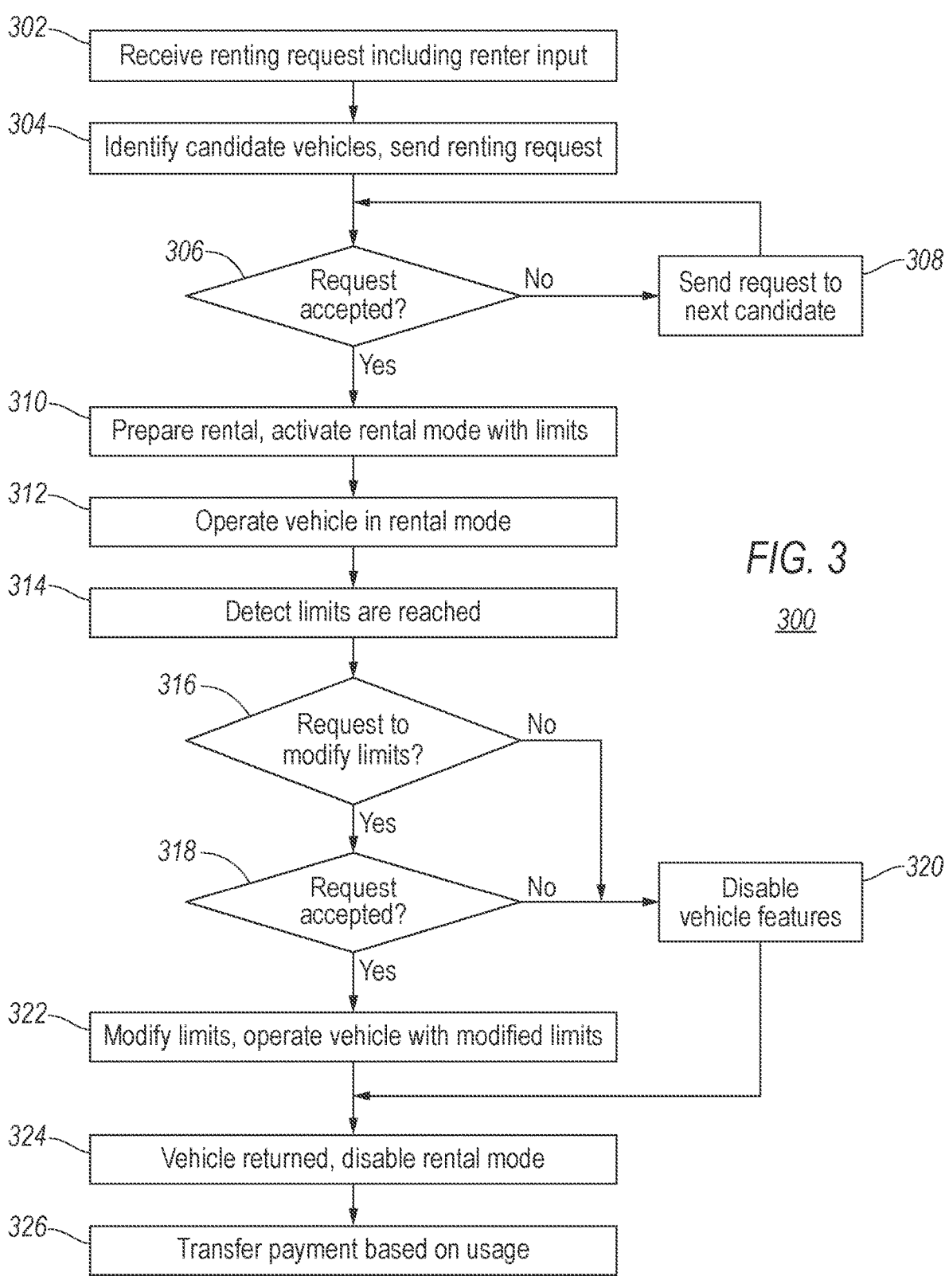

302 — Receive renting request including renter input

304 — Identify candidate vehicles, send renting request

306 — Request accepted?

No → 308 — Send request to next candidate

Yes

310 — Prepare rental, activate rental mode with limits

312 — Operate vehicle in rental mode

314 — Detect limits are reached

316 — Request to modify limits?

No

Yes

318 — Request accepted?

No → 320 — Disable vehicle features

Yes

322 — Modify limits, operate vehicle with modified limits

324 — Vehicle returned, disable rental mode

326 — Transfer payment based on usage

VEHICLE WITH RENTAL MODE AND POWER CONTROLS

TECHNICAL FIELD

The present disclosure relates to a vehicle system for exporting electric power.

BACKGROUND

Electric vehicles (EVs) may be provided with a traction battery for supplying electric power for propulsion. The traction battery may also be configured to supply electric power to power appliances via one or more power output ports.

SUMMARY

A vehicle includes an electric machine that generates propulsive power for the vehicle, a power outlet, a traction battery that provides power to the electric machine and to the power outlet, and a controller. The controller, responsive to receiving a message from a device remote from the vehicle defining a power limit during a rental mode of operation for the power outlet, prevents power output by the power outlet from exceeding the power limit during the rental mode of operation and responsive to the power output reaching the power limit during the rental mode of operation, generates a request for the device to increase the power limit.

A method includes, responsive to receiving indication a vehicle has exited a rental mode of operation during which a power outlet of the vehicle was disabled from supplying power from a source of power to any electrically powered device connected to the power outlet, enabling the power outlet to supply power from the source.

A power system for a vehicle includes a controller that, responsive to receiving a message from a device remote from the vehicle defining a state of charge threshold for a traction battery during a rental mode of operation and a state of charge of the traction battery reaching the state of charge threshold during the rental mode of operation, disables the power outlet and generates a request for the device to enable the power outlet.

BRIEF DESCRIPTION OF THE DRAWINGS

FIG. 3 illustrates a flow diagram of a process for coordinating vehicle rental and operating the vehicle in the rental mode.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a vehicle system for exporting electric power from a traction battery.

Figure 1:
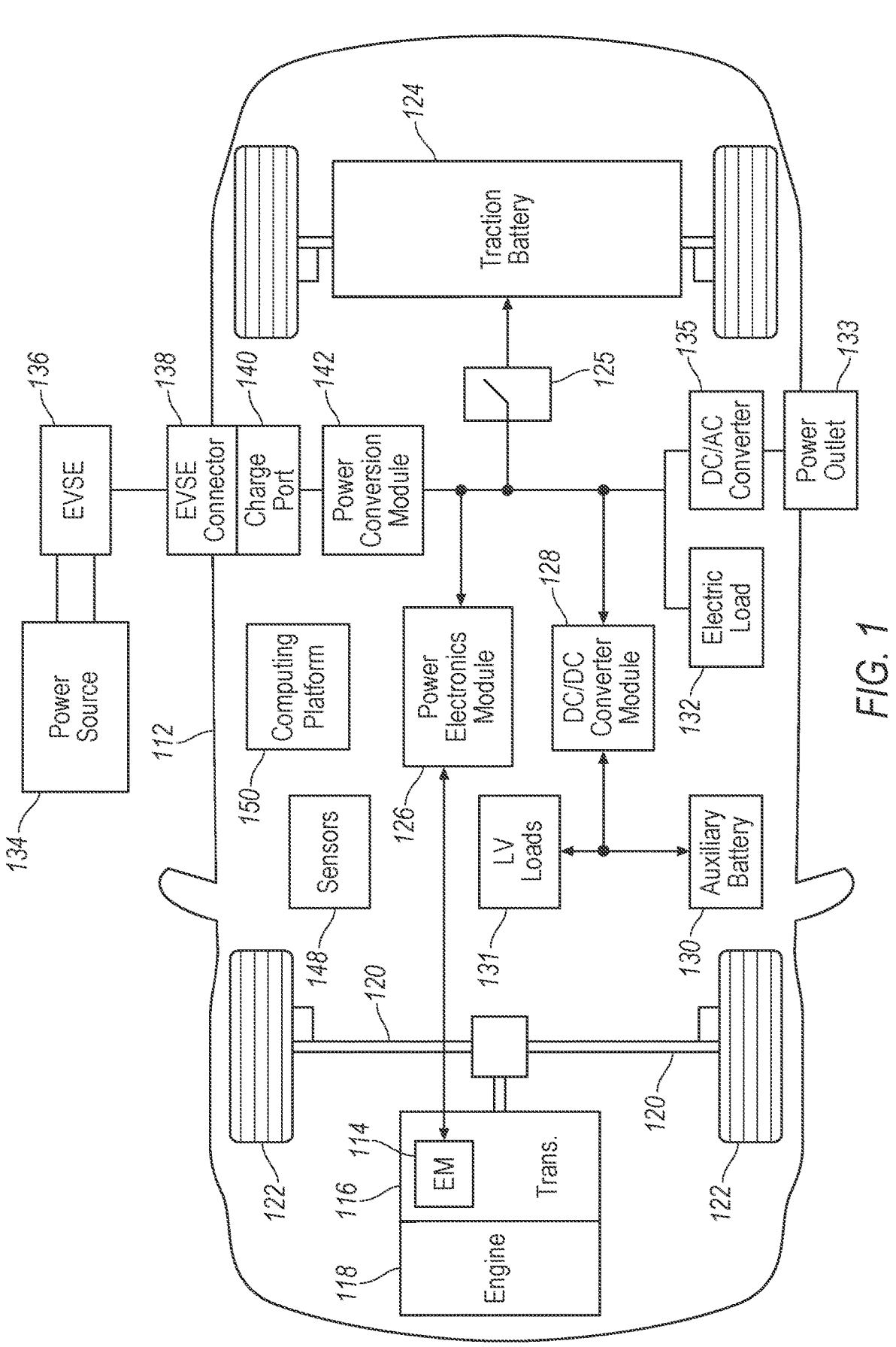
FIG. 1 illustrates an example block topology of an electrified vehicle illustrating drivetrain and energy storage components.

FIG. 1 depicts an electrified vehicle 112 that may be referred to as a plug-in hybrid-electric vehicle (PHEV), a battery electric vehicle (BEV), a mild hybrid-electric vehicle (MHEV), and/or a full hybrid electric vehicle (FHEV). A plug-in hybrid-electric vehicle 112 may comprise one or more electric machines 114 mechanically coupled to a hybrid transmission 116. Alternatively, the vehicle 112 may further include a vehicle running on conventional fuel without a traction battery. The electric machines 114 may be capable of operating as a motor or a generator. In addition, the hybrid transmission 116 is mechanically coupled to an engine 118. The engine 118 may be an internal combustion engine and/or a compression engine consuming conventional fuel (e.g. gasoline or diesel). The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. The engine 118 may also act as a generator and generate electric power to supply to the electric machine 114 and/or the traction battery 124. Additionally or alternatively, the vehicle 112 may be provided with an external power generating device (not shown). For instance, the external power generating device may convert conventional fuel (e.g. gasoline, propane) into electric power. Alternatively, the external power generating device may include one or more green energy sources (e.g. a solar panel, wind turbine) or the like.

A traction battery or battery pack 124 may store energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 125 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may include one or more low-voltage loads 131 that may be electrically coupled to the auxiliary battery 130. The low-voltage loads 131 may include one or more components integrated with the vehicle 112. Additionally or alternatively, the low-voltage loads 131 may include one or more external components/devices electrically connected to the auxiliary battery 131 via one or more wired (e.g. universal serial bus (USB)) or wireless connectors (e.g. wireless charger).

One or more electrical loads 132 may be coupled to the high-voltage bus/rail. The electrical loads 132 may have an associated controller that operates and controls the electrical loads 132 when appropriate. Examples of electrical loads 132 may be a fan, an electric heating element, and/or an air-conditioning compressor. The vehicle 112 may be further configured to provide electric power supply to an external power device (not shown) via one or more power outlets (power sockets) 133 through a DC/AC converter 135. The power outlet 133 may be located inside and/or outside the vehicle cabin. For instance, the power outlet 133 may be receptacles configured to correspond to the US National Electronical Manufacturers Association (NEMA) connectors used in North America, although power receptacles supporting other standards may be used under essentially the same concept. The DC/AC converter 135 may be electrically coupled between the traction battery 124 and the power outlet 133 and configured to convert the high voltage DC current from the traction battery 124 into an AC current with a corresponding voltage (e.g. 120V, 240V or the like) compatible with the external power devices. The power outlet 133 may be further configured to operate as a power inlet port connected to the external power generating device to charge the battery 124.

The electrified vehicle 112 may be configured to recharge the traction battery 124 from an external power source 134. The external power source 134 may be a connection to an electrical outlet. The external power source 134 may be electrically coupled to a charger or electric vehicle supply equipment (EVSE) 136. The external power source 134 may be an electrical power distribution network or grid as provided by an electric utility company. The EVSE 136 may provide circuitry and controls to regulate and manage the transfer of energy between the power source 134 and the vehicle 112. The external power source 134 may provide DC or AC electric power to the EVSE 136. The EVSE 136 may have a charge connector 138 for plugging into a charge port 140 of the vehicle 112. The charge port 140 may be any type of port configured to transfer power from the EVSE 136 to the vehicle 112. The charge port 140 may be electrically coupled to a charger or on-board power conversion module 142. The power conversion module 142 may condition the power supplied from the EVSE 136 to provide the proper voltage and current levels to the traction battery 124. The power conversion module 142 may interface with the EVSE 136 to coordinate the delivery of power to the vehicle 112. The EVSE connector 138 may have pins that mate with corresponding recesses of the charge port 140. Alternatively, various components described as being electrically coupled or connected may transfer power using a wireless inductive coupling.

The vehicle 112 may be provided with various sensors 148 to perform various measurements. As a few non-limiting examples, the sensors 148 may include an electric power sensor in communication with the power outlet 133 configured to detect the type of the external power devices connected to the power outlet 133. The sensors 148 may further include a vehicle weight sensor configured to measure the weight of the vehicle 112. The sensor data may be transmitted to a controller or computing platform 150 for processing and analysis. The computing platform 150 may be further configured to limit the operation of the power outlets and/or vehicle propulsion system based on the vehicle weight measured by the weight sensor 148. For instance, responsive to weight exceeding a threshold, the computing platform 150 may limit operations of the power outlets 133 as well as the driving of the vehicle 112. In the rental mode (to be discussed in detail below), the limitation on vehicle weight may prevent customer misusing of vehicle while renting. The sensors 148 may further include other types of sensors such as ambient temperature sensors, battery temperature sensor which may be employed for the similar purposes during the rental mode.

Figure 2:
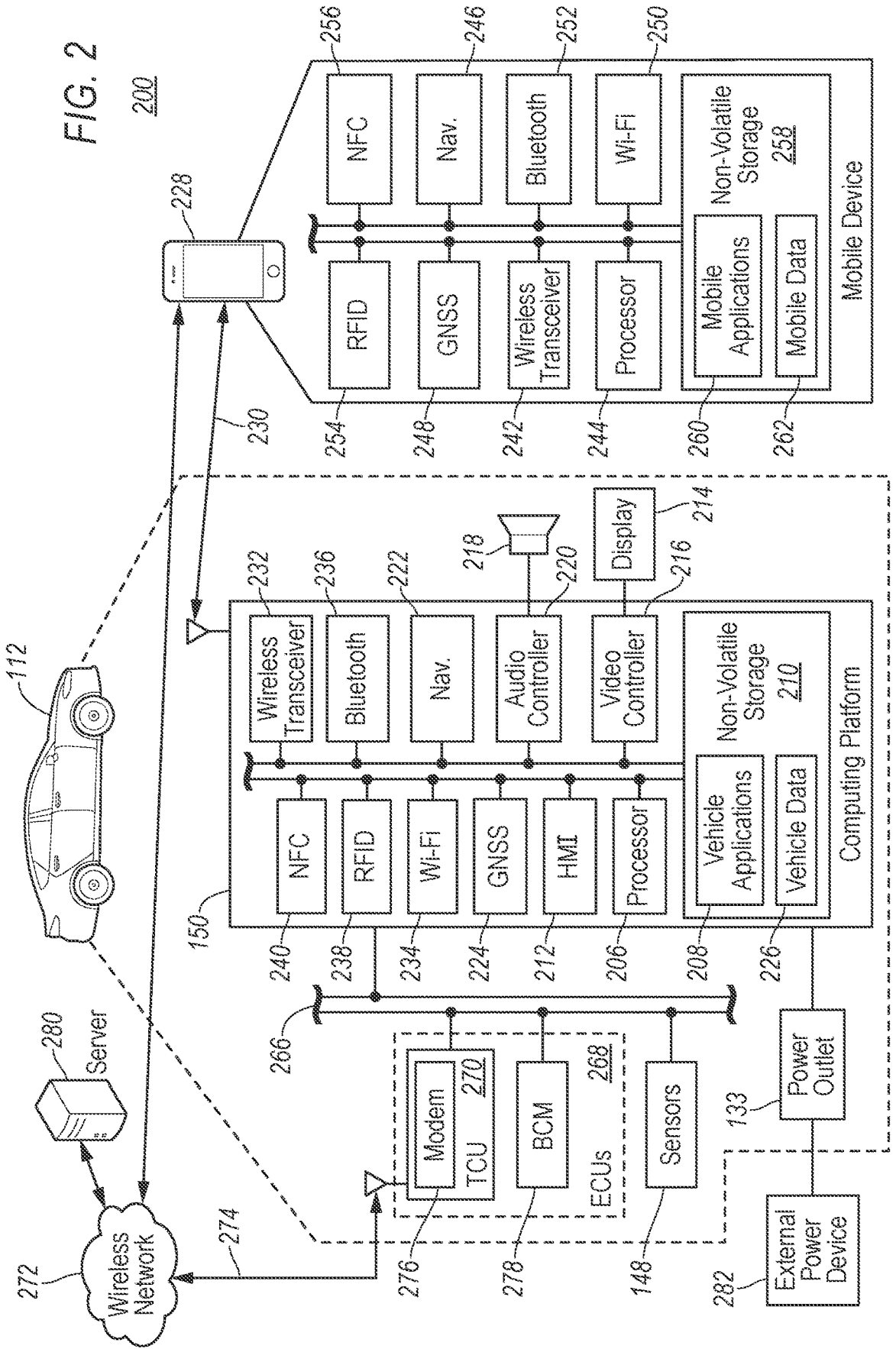
FIG. 2 illustrates an example block topology of a vehicle rental coordination system.

Referring to FIG. 2, an example block topology of a vehicle rental coordination system 200 of one embodiment of the present disclosure is illustrated. It should be noted that the illustrated system 200 is merely an example, and more, fewer, and/or differently located elements may be used.

As illustrated in FIG. 2, the computing platform 150 may include one or more processors 206 configured to perform instructions, commands, and other routines in support of the processes described herein. For instance, the computing platform 150 may be configured to execute instructions of vehicle applications 208 to provide features such as navigation, remote controls, autonomous driving, and wireless communications. Such instructions and other data may be maintained in a non-volatile manner using a variety of types of computer-readable storage medium 210. The computer-readable medium 210 (also referred to as a processor-readable medium or storage) includes any non-transitory medium (e.g., tangible medium) that participates in providing instructions or other data that may be read by the processor 206 of the computing platform 150. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The computing platform 150 may be provided with various features allowing the vehicle occupants/users to interface with the computing platform 150. For example, the computing platform 150 may receive input from HMI controls 212 configured to provide for occupant interaction with the vehicle 112. As an example, the computing platform 150 may interface with one or more buttons, switches, knobs, or other HMI controls configured to invoke functions on the computing platform 150 (e.g., steering wheel audio buttons, a push-to-talk button, instrument panel controls, etc.).

The computing platform 150 may also drive or otherwise communicate with one or more displays 214 configured to provide visual output to vehicle occupants by way of a video controller 216. In some cases, the display 214 may be a touch screen further configured to receive user touch input via the video controller 216, while in other cases the display 214 may be a display only, without touch input capabilities. The computing platform 150 may also drive or otherwise communicate with one or more speakers 218 configured to provide audio output and input to vehicle occupants by way of an audio controller 220.

The computing platform 150 may also be provided with navigation and route planning features through a navigation controller 222 configured to calculate navigation routes responsive to user input via, for example, the HMI controls 212, and output planned routes and instructions via the speaker 218 and the display 214. Location data that is needed for navigation may be collected from a global navigation satellite system (GNSS) controller 224 configured to communicate with multiple satellites and calculate the location of the vehicle 112. The GNSS controller 224 may be configured to support various current and/or future global or regional location systems such as global positioning system (GPS), Galileo, Beidou, Global Navigation Satellite System (GLONASS) and the like. Map data used for route planning may be stored in the storage 210 as a part of the vehicle data 226. Navigation software may be stored in the storage 210 as one of the vehicle applications 208.

The computing platform 150 may be configured to wirelessly communicate with one or more mobile devices 228 of the vehicle users via a wireless connection 230. The mobile device 228 may be any of various types of portable computing devices, such as cellular phones, tablet computers, wearable devices, smart watches, smart fobs, laptop computers, portable music players, or other devices capable of communication with the computing platform 150. A wireless transceiver 232 may be in communication with a Wi-Fi controller 234, a Bluetooth controller 236, a radio-frequency identification (RFID) controller 238, a near-field communication (NFC) controller 240, and other controllers such as a Zigbee transceiver, an IrDA transceiver, an ultra-wide band (UWB) controller (not shown), and be configured to communicate with a compatible wireless transceiver 242 of the mobile device 228.

The mobile device 228 may be provided with a processor 244 configured to perform instructions, commands, and other routines in support of the processes such as navigation, telephone, wireless communication, and multi-media processing. For instance, the mobile device 228 may be provided with location and navigation functions via a navigation controller 246 and a GNSS controller 248. The mobile device 228 may be provided with the wireless transceiver 242 in communication with a Wi-Fi controller 250, a Bluetooth controller 252, a RFID controller 254, an NFC controller 256, and other controllers (not shown), configured to communicate with the wireless transceiver 232 of the computing platform 150. The mobile device 228 may be further provided with a non-volatile storage 258 to store various mobile applications 260 and mobile data 262.

The computing platform 150 may be further configured to communicate with various components of the vehicle 112 via one or more in-vehicle networks 266. The in-vehicle network 266 may include, but is not limited to, one or more of a controller area network (CAN), an Ethernet network, and a media-oriented system transport (MOST), as some examples. Furthermore, the in-vehicle network 266, or portions of the in-vehicle network 266, may be a wireless network accomplished via Bluetooth low-energy (BLE), Wi-Fi, UWB, or the like.

The computing platform 150 may be configured to communicate with various electronic control units (ECUs) 268 of the vehicle 112 configured to perform various operations. For instance, the ECUs 268 may include a telematics control unit (TCU) 270 configured to control telecommunication between the vehicle 112 and a wireless network 272 through a wireless connection 274 using a modem 276. The wireless connection 274 may be in the form of various communication networks, for example, a cellular network. Through the wireless network 272, the vehicle may access one or more servers 280 to access various content for various purposes. It is noted that the terms wireless network and server are used as general terms in the present disclosure and may include any computing network involving carriers, routers, computers, controllers, circuitry or the like configured to store data and perform data processing functions and facilitate communication between various entities.

The ECUs 268 may further include a body control module (BCM) 278 configured to operate various body features of the vehicle 112. For instance, the BCM 278 may be configured to monitor and control the operation of the electric load 132 as well as the power outlet 133 that is configured to supply electric power to one or more external power devices 282. The external power devices 282 are used as a general term in the present disclosure and may include various devices, apparatuses and hardware powered by electricity. As a few non-limiting examples, the external power devices 282 may include one or more appliances (e.g. television, refrigerator, cooking stove or the like), power tools, electric lights, power camping equipment or the like each having a power rating. Additionally, the external power devices 282 may further include the external power generating devices to charge the traction battery 124 discussed above. The sensors 148 may be configured to detect the type and power rating of the external power devices 282 and report the detected information to the computing platform 150 and BCM 278. Combined with the information indicative of the status of the battery 124 such as vehicle weight, the temperature, and battery SOC, the computing platform 150 may determine and predict the driving range (distance to empty (DTE)) of the vehicle 112. The external power devices 282 may be further provided with wireless communication capabilities configured to communicate with the wireless transceiver 232 of the computing platform 150. For instance, the external power devices 282 may be provided with an RFID controller (not shown) in short-range communication with the computing platform 150 regarding the status and power rating of the devices. The computing platform 150 may detect the presence or absence of one or more of the external power devices 282 based on the short-range wireless communication such that an anticipated power output via the power outlet 133 may be calculated.

In the present disclosure, the power outlet 133 may include a plurality of power outlet ports individually or collectively controlled by the BCM 278 and or the computing platform 150. The vehicle 112 may individually turn on and off each of the power outlet ports as a part of the vehicle energy management scheme. In addition, different power outlet ports may be configured to supply different voltages. For instance, the power outlet 133 may include a first power outlet port configured to supply 120V electric power, and a second power outlet port configured to supply 240V electric power. The output outlet ports may be individually controlled by the BCM 278.

The present disclosure proposes a system that allows vehicle users to share/rent the vehicle 112 for exporting electric power. More specifically, the system may allow the owner to rent the vehicle 112 out for power exportation as the primary purpose in the rental mode with certain vehicle features disabled and/or restricted. The owner may impose a variety of restrictions such as power output limit, energy limit or the like during the rental mode when the vehicle is rented out. Those restricted features may be unlocked with extra charges upon the owner's approval.

With reference to FIG. 3, a flow diagram of a process 300 for coordinating vehicle rental and operating the vehicle in the rental mode is illustrated. With continuing reference to FIGS. 1 and 2, the process 300 may be collectively implemented via various components of the vehicle rental coordination system 200. For instance, some operations of the process 300 may be implemented via the server 280 whereas other operations may be implemented via the computing platform 150 of the vehicle 112 and mobile device 228. At operation 302, the vehicle rental coordination system 200 receives a rental request from a vehicle renter. For instance, the renter may make the request by placing an order with the server 280 using a renter mobile device 228 associated with the vehicle rental coordination system 200. The rental request may include various renter input indicative of rental conditions. For instance, the renter input may include a pickup and return location area, rental duration, estimated mileage, power use purpose, intended power devices, expected power/energy amount or the like. Responsive to receiving the request, the rental coordination system 200 identifies candidate vehicles that meet the proposed renter input at operation 304. The pool for candidate vehicles may be based on a user-subscription based system which allows vehicle owners to sign up for the rental service in exchange for compensation such as client credits, cash reward or the like. Candidate vehicle information such as vehicle location, model, power limit, and/or current battery state of charge (SOC) may be periodically reported to the rental coordination system 200 to facilitate the identification. In the present example, the vehicle 112 may be one of the candidate vehicles within the pool. Responsive to identifying the vehicle 112 matching the renter input (e.g. based on location, power limit or the like), an offer message may be sent to the vehicle owner of the vehicle 112. The offer message may include the entire or partial information of the rental request initiated by the renter and may be sent to a mobile device 228 associated with the vehicle owner for approval. The vehicle owner may view the offer message with the renter input indicative of the rental conditions and decide whether to accept the offer. If the owner decides to decline the offer as the renter request is unacceptable, an input indicative of the request being declined may be made via the mobile device 228. In response, the process proceeds from operation 306 to operation 308 and the vehicle rental coordination system 200 proceeds to the next available candidate vehicle by forwarding the rental request. The vehicle identification and selection operations 306 and 308 may be based on capability needs, proximity, and expenses. In one example, the vehicle identification operation may prioritize vehicles most closely assimilate the vehicle capability requirements based on the renter's needs as well as proximity to renter location. The process may then cascade to other over-capability alternatives (which may result in higher expenses).

Otherwise, if the owner accepts the rental offer via the mobile device 228, the process proceeds to operation 310 to start preparing for the rental. The entire or a part of the renter input may be sent to the vehicle 112 to facilitate the transaction. For instance, the renter input may include an estimated total amount of energy during the rental period. Additionally or alternatively, a drop-down list of electrical devices may be provided to the renter such that they can select all devices intended to be powered and the duration. The vehicle power requirements may be estimated based on the user selection. The vehicle 112 may determine a required amount of charge (e.g. battery SOC) based on the estimated total amount. If the current battery SOC is insufficient to satisfy the estimated total amount, the vehicle may automatically start charging (in situations such as the charger is already connected). Alternatively, if the vehicle 112 is provided with autonomous driving features, the vehicle 112 may autonomously drive to a charging device and start charging in preparation of the rental. In addition, the owner of the vehicle 112 may impose a variety of usage limitations during the rental period. The limitations may generally correspond to the renter input indicative of expected usage conditions during the rental. For instance, the usage limitations may include a limitation restricting the power outlet to supply electric power beyond a threshold during the rental period. The limitation may be determined using the energy use purpose, intended power devices or the like that are included in the renter input. Additionally or alternatively, the usage limitations may include a distance to empty (DTE) and/or minimum SOC limit based on battery durability and warranty policy. For instance, the power output via the power outlet 133 may automatically stop once the battery SOC reaches a threshold (e.g. 15%) corresponding to a driving range to protect the traction battery 124 from being over-discharged. Additionally or alternatively, the usage limitations may include a power voltage limitation (e.g. 120V outlet only) based on the intended power devices. Additionally or alternatively, the usage limitations may include a power output condition that relates to vehicle operation status such as vehicle speed. For instance, the vehicle 112 may only output power via the power outlet 133 when parked. Additionally or alternatively, the usage limitations may further include a driving limitation such as a speed limit, distance limit, and geofence of the vehicle 112. Additionally or alternatively, the usage limitations may further include a vehicle weight restriction. Once the rental period starts, at operation 310, the vehicle 112 may activate the rental mode to impose the usage limitations. Additionally or alternatively, the usage limitations may further include limitations to other features or functions of the vehicle, or operation within certain conditions such as ambient temperature limits.

At operation 312, the vehicle 112 operates in the rental mode with the usage limitations in place. In one embodiment, the vehicle 112 may grant access to the owner as well as other components of the rental coordination system 200 to monitor the operation of the vehicle 112 during the rental mode. The owner may monitor vehicle status such as battery SOC, location, electric output power in a real-time manner. In addition, various components of the vehicle 112 continuously monitor the operation status of the vehicle 112. The BCM 278 may monitor the power output via the power outlet and the connected external power devices. The computing platform 150 may monitor the vehicle location and driving condition (e.g. speed). At operation 314, responsive to detecting one or more of the usage limitations being met, the computing platform 150 notifies the vehicle renter and asks if the renter would like to request to modify the limitation to continue to use the power features. In one example, the computing platform 150 may interact with the renter via the HMI controls 212. Additionally or alternatively, the computing platform 150 may interact with the renter via a mobile device 228 associated with the renter. If the renter decides not to request to modify the limitations, the process proceeds from operation 316 to operation 320 to disable one or more vehicle features. For instance, responsive to the minimum battery SOC (e.g. 15%) being reached, the BCM 278 may disable the power outlet 133 while continuing to allow the vehicle 112 to be driven. Otherwise, if the renter requests to modify the limitation, the process proceeds to operation 318 to seek owner approval. Continuing with the above example, the renter may request the owner to lower the minimum battery SOC (e.g. from 15% to 10%) to keep using the power outlet 133. If the vehicle owner declines the request via the mobile device 228, the process proceeds from operation 318 to operation 320. Otherwise, if the owner approves the request, the process proceeds to operation 322 and the vehicle 112 modifies the requested limitations and continues to operate with the modified limitations. In other examples, the renter may request to increase the energy output limit, to increase the power voltage, to change the energy use purpose or the like subject to the owner's approval with additional charges. At operation 324, when the vehicle 112 is returned to the owner, the computing platform 150 may disable the rental mode to remove the usage limitations. At operation 326, payment may be transferred to the vehicle owner based on the usage. For instance, the amount of payment may be determined and adjusted based on the energy usage during the rental period. A higher amount of energy used may result in a higher payment. The cost may be influenced by various factors such as cost of energy per location, overall energy consumed, type of vehicle, demand, or the like. Other factors such as battery deterioration factors may imply additional costs. Additionally, a post renting report which details overall usage and explains costs associated with the service may be sent to both the vehicle owner and renter.

It is noted that although the process 300 is described with reference to a battery electric vehicle, the present disclosure is not limited thereto. The process 300 may applicable to a hybrid vehicle, and/or a conventional vehicle (without a traction battery) under substantially the same concept.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an electric machine configured to generate propulsive power for the vehicle;
a power outlet;
a traction battery configured to provide power to the electric machine and to the power outlet; and
a controller programmed to, responsive to receiving a message from a device remote from the vehicle defining a power limit during a rental mode of operation for the power outlet, prevent power output by the power outlet from exceeding the power limit during the rental mode of operation and responsive to the power output reaching the power limit during the rental mode of operation, generate a request for the device to increase the power limit.

2. The vehicle of claim 1, wherein the controller is further programmed to, responsive to receiving a message from the device defining a second power limit during the rental mode of operation greater than the power limit, permit the power output to exceed the power limit.

3. The vehicle of claim 1, wherein the controller is further programmed to, responsive to receiving a message from the device to disable the power outlet during the rental mode of operation, prevent the power outlet from supplying power during the rental mode of operation.

4. The vehicle of claim 3, wherein the controller is further programmed to, responsive to indication of exit from the rental mode of operation, permit the power outlet to supply power therefrom.

5. The vehicle of claim 1, wherein the controller is further programmed to, responsive to receiving a message from the device defining a state of charge threshold for the traction battery and the state of charge reaching the state of charge threshold during the rental mode of operation, prevent the power outlet from supplying power during the rental mode of operation.

6. The vehicle of claim 5, wherein the controller is further programmed to, responsive to the state of charge reaching the state of charge threshold during the rental mode of operation, generate a request for the device to decrease the state of charge threshold.

7. The vehicle of claim 6, wherein the controller is further programmed to, responsive to receiving a message from the device defining a second state of charge threshold less than the state of charge threshold, permit the power outlet to supply power therefrom.

8. A method comprising:
    responsive to receiving indication a vehicle has exited a rental mode of operation during which a power outlet of the vehicle was disabled from supplying power from a source of power to any electrically powered device connected to the power outlet, enabling the power outlet to supply power from the source.

9. The method of claim 8, wherein the source is a traction battery, the method further comprising, responsive to receiving a message from a device remote from the vehicle defining a state of charge threshold for the traction battery during the rental mode of operation and the state of charge reaching the state of charge threshold, disabling the power outlet.

10. The method of claim 8 further comprising, responsive to receiving a message from a device remote from the vehicle defining a power limit during the rental mode of operation for another power outlet of the vehicle, preventing power output by the another power outlet from exceeding the power limit during the rental mode of operation.

11. The method of claim 10 further comprising, responsive to the power output reaching the power limit during the rental mode of operation, generating a request for the device to increase the power limit.

12. The method of claim 11 further comprising, responsive to receiving a message from the device defining a second power limit during the rental mode of operation greater than the power limit, permitting the power output to exceed the power limit.

13. The method of claim 8, wherein the source is an engine.

14. A power system for a vehicle comprising:
    a controller programmed to, responsive to receiving a message from a device remote from the vehicle defining a state of charge threshold for a traction battery during a rental mode of operation and a state of charge of the traction battery reaching the state of charge threshold during the rental mode of operation, disable a power outlet and generate a request for the device to enable the power outlet.

15. The power system of claim 14, wherein the controller is further programmed to, responsive to receiving a message from the device defining a second state of charge threshold during the rental mode of operation less than the state of charge threshold, enable the power outlet.

16. The power system of claim 14, wherein the controller is further programmed to, responsive to receiving indication the vehicle has exited the rental mode of operation during which the power outlet was disabled, enable the power outlet.

17. The power system of claim 16, wherein the controller is further programmed to generate a summary of energy usage during the rental mode and process a payment associated with the rental mode.

18. The power system of claim 14, wherein the controller is further programmed to, responsive to receiving a message from the device defining a power limit during the rental mode of operation for the power outlet, prevent power output by the power outlet from exceeding the power limit during the rental mode of operation.

19. The power system of claim 18, wherein the controller is further programmed to, responsive to the power output reaching the power limit during the rental mode of operation, generate a request for the device to increase the power limit.

20. The power system of claim 18, wherein the controller is further programmed to, responsive to receiving a message from the device defining a second power limit during the rental mode of operation greater than the power limit, permit the power output to exceed the power limit.

* * * * *